UNITED STATES PATENT OFFICE.

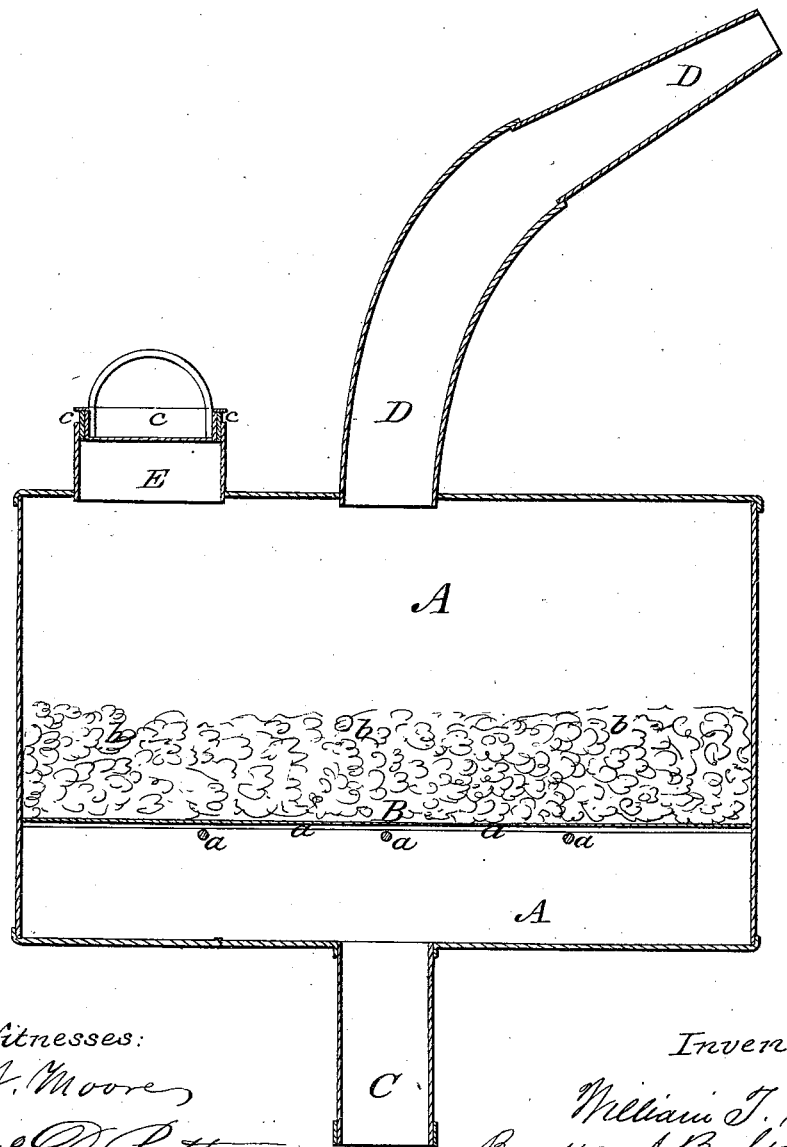

WILLIAM T. CLASS, OF CUMMINSVILLE, ASSIGNOR TO E. RUBENOW AND CHAS. JOSEPH, OF CINCINNATI, OHIO.

IMPROVEMENT IN FILTERS.

Specification forming part of Letters Patent No. 44,253, dated September 13, 1864.

*To all whom it may concern:*

Be it known that I, WILLIAM T. CLASS, of Cumminsville, in the county of Hamilton and State of Ohio, have invented certain new and useful Improvements in a Filter; and I do hereby declare the following to be a full, clear, and exact description of the same, reference being had to the accompanying drawing, making a part of this specification, in which—

Figure 1 represents a vertical section through the filter.

My invention consists in dividing the interior of the case by a perforated diaphragm, so as to leave an upper and lower chamber, the upper chamber to be supplied with a filtering substance composed of a pulp, such as paper is made of, or of paper reduced to a pulpy condition by maceration, and the lower chamber left open and free for the filtered liquid to drop or pass into.

To enable others skilled in the art to make and use my invention, I will proceed to describe the same with reference to the drawing.

A represents a metallic case, of any suitable size or shape, the interior of which case is divided horizontally by a perforated diaphragm, B, of woven wire, or of a punched metallic plate, which may rest upon cross rods or bars $a\ a\ a$, &c., to support it and the material that lies upon it. Into the chamber above the diaphragm I place paper pulp, or a pulp made by the maceration of paper, as shown at $b$, this being the filtering substance I use, and which I find very cheap, easily replaced, and very efficacious. In the lower head of the case A there is a pipe, C, by which the filtered liquid may be conveyed or drawn off. The liquid to be filtered, if it comes from a hydrant or reservoir, flows through the pipe D, thence through the filtering medium $b$, and thence out by the pipe C; but if the liquid is furnished to the filter by means of a pump, either a suction or force pump, then it would be introduced at C and taken out at D, in which latter case the filtering medium $b$ should be below the diaphragm B.

E is a man hole covered by a tight-nut, $c$. This opening is made for the introduction, removal, or replacement of the filtering medium, and avoids the necessity of making the outer case in two parts, which have to be unscrewed and again screwed up to get at the filtering material within, and this unscrewing requires the filter to be detached from the pipes, so that it can be opened—an operation not easily accomplished by the common users of such articles.

The paper pulp is not only a good filtering medium, but is easily washed out when filled with sediment, either by taking it out or by stirring it up in the filter, and at the same time allowing clean water to flow through it.

What I claim as an improvement upon filters is—

The single case A, with an inlet and exit pipe and man-hole, and a perforated diaphragm dividing the interior of the case into two apartments, one of which shall contain paper pulp or macerated paper as a filtering medium, all as herein described and represented.

WILLIAM T. CLASS.

Witnesses:
CHAS. JOSEPH,
ERNST RUBENOW.